E. J. MOLERA & J. C. CEBRIAN. 2 Sheets—Sheet 1.
Microscope.

No. 230,320. Patented July 20, 1880.

WITNESSES
E. Stottingham
A. W. Bright.

INVENTOR
E. J. Molera.
J. C. Cebrian.
By H. A. Seymour, ATTORNEY

2 Sheets—Sheet 2.

E. J. MOLERA & J. C. CEBRIAN.
Microscope.

No. 230,320. Patented July 20, 1880.

UNITED STATES PATENT OFFICE.

EUSEBIUS J. MOLERA AND JOHN C. CEBRIAN, OF SAN FRANCISCO, CAL.

MICROSCOPE.

SPECIFICATION forming part of Letters Patent No. 230,320, dated July 20, 1880.

Application filed January 27, 1880.

*To all whom it may concern:*

Be it known that we, EUSEBIUS J. MOLERA and JOHN C. CEBRIAN, of San Francisco, in the county of San Francisco and State of California, have invented certain new and useful Improvements in Microscopes; and we do hereby declare the following to be a full, clear, and exact description of the invention, such as will enable others skilled in the art to which it pertains to make and use it, reference being had to the accompanying drawings, which form part of this specification.

Our invention is more especially intended to provide means whereby an observer can easily read matter previously reduced to a microscopical scale by photographic apparatus constituting separate application for patent.

Our improvements relate to the optical construction of a binocular microscope, and also to the plate-holder employed in presenting the plate of reduced matter to the objective glass.

The invention consists, first, in the combination, with eye-lenses and large field-lenses, of two intermediate prisms respectively located next to the eye-lenses and adapted to bring the two separate images nearer together; second, in the combination, with a frame in which a plate-holder and its slide are adapted to have independent or joint movement, of an inclosing-frame in which said plate-holder frame and its slide are adapted to have independent or joint movement, said parts being adapted to permit the plate-holder to be adjusted vertically and horizontally by both quick and slow movements.

Figure 1:
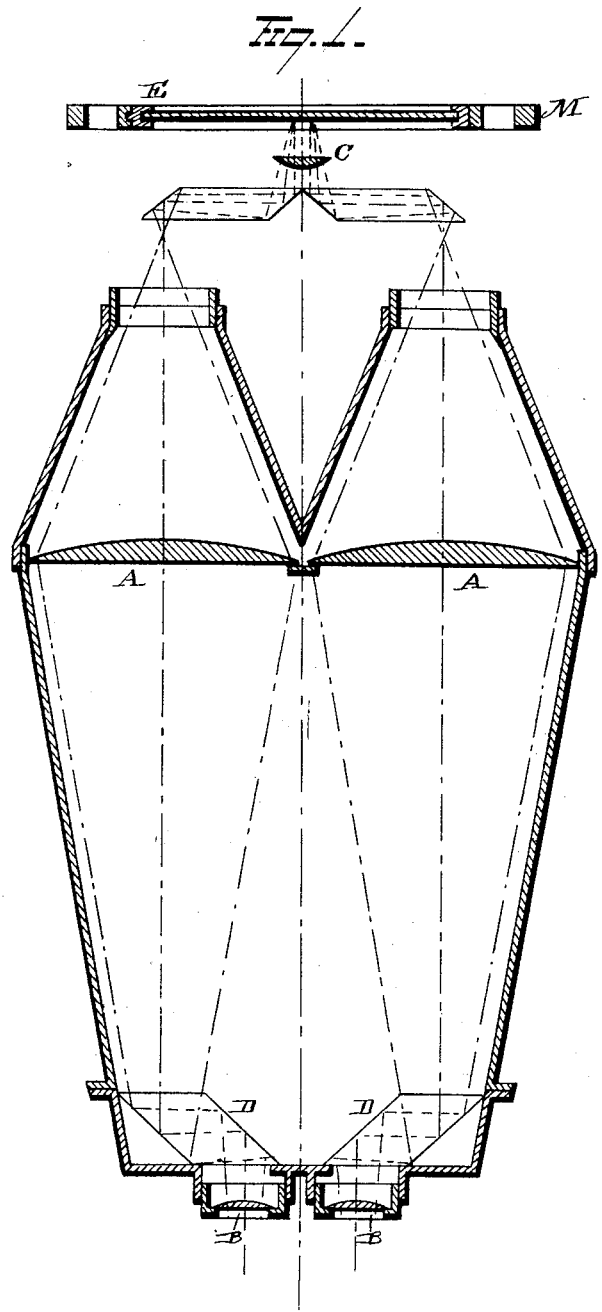
Figure 2:
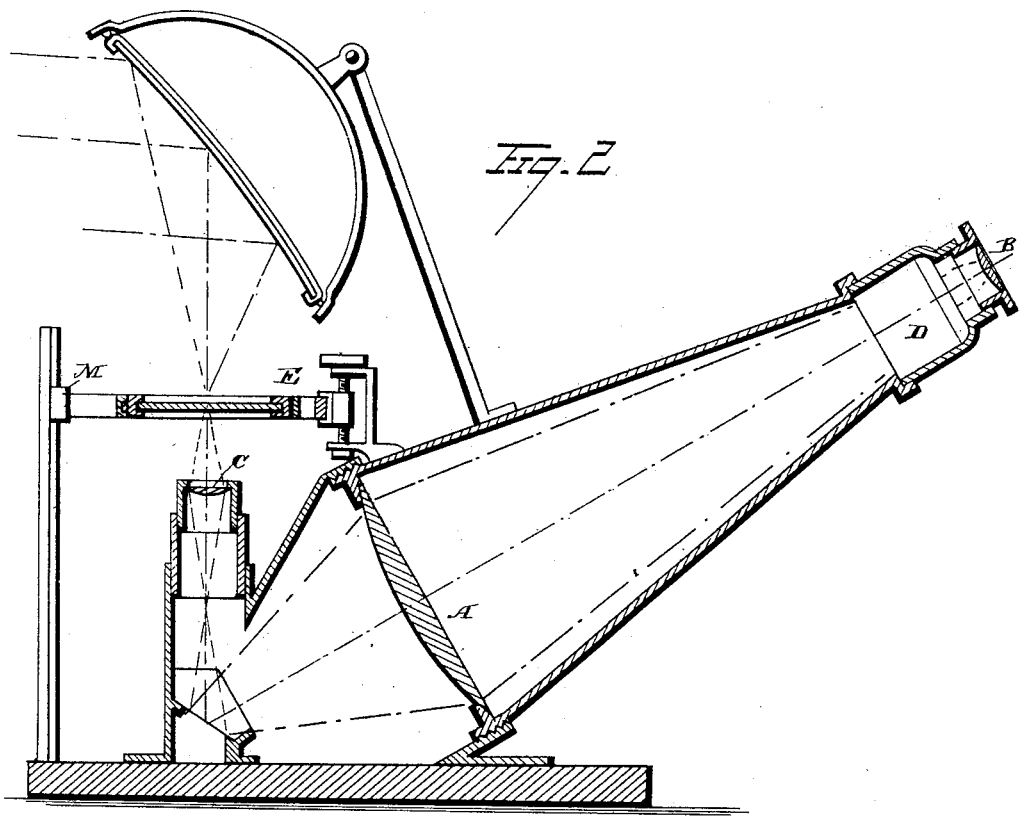
Figure 3:
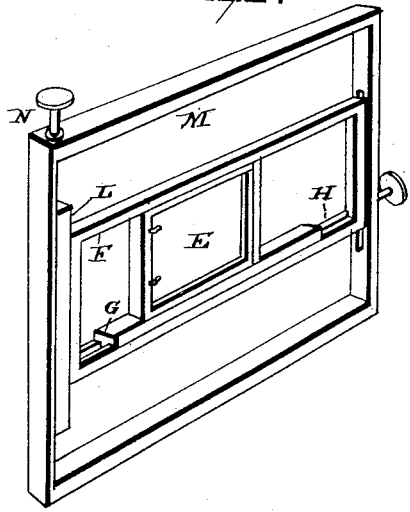

Referring to the drawings, Figure 1 is a central horizontal section of one form of microscope embodying our invention. Fig. 2 represents the same invention embodied in a different form of microscope. Fig. 3 is a detail perspective view of the plate-holder.

The two field-lenses A and the two eye-lenses B are made of large diameter and of comparatively short focal distances. Their distance from the objective glass C is such as to cause a large field of vision. This large size of the field-lenses results in forming two separate images at such a distance apart from each other that it is impossible to simultaneously view the object with both eyes. We therefore place the two prisms D intermediate of the object-lenses and eye-lenses and near to the latter. Each prism inclines laterally inward from its end nearest the field-lens to its end nearest the eye-lens, so that the pencils of light which come from the field-lens strike the outer side of the prism and are deflected inwardly against the opposite side of the prism. The pencils of light are then deflected from said inner side of the prism, and are thus brought in line with the eye-lens. In this manner the two separate images are brought sufficiently near together to permit the observer to simultaneously use both eyes.

This part of our invention is represented in the first two figures of the drawings as embodied in two different forms of microscope. It is obvious, however, that the principle of the improvement is merely illustrated in these microscopes, and that any change, substitution, or omission of parts may be made, provided the essential features of invention hereinafter claimed are employed.

The plate-holder E is adapted to have sliding movement in frame F, either independently of or jointly with its slide G, the latter having screw-thread engagement with shaft H, which permits it to be adjusted to and fro as desired. This plate-holder frame is itself provided with a slide, L, and is adapted to be moved in the inclosing-frame M, either independently of or jointly with its slide. A shaft, N, has screw-thread engagement with this latter slide.

It is apparent that by taking hold of frame F with his hand the observer may quickly adjust the plate-holder vertically. If a slower vertical adjustment, however, is desired it is obtained by operating shaft N, which moves slide L, carrying frame F, up or down in frame M. If a quick horizontal adjustment of the plate-holder is desired the latter may be moved by the hand to any point in frame F. If, however, a slow horizontal adjustment is desired, by operating shaft H slide G, carrying the plate-holder, may be correspondingly moved. It is thus apparent that the plate-holder may be adjusted vertically and horizontally by both quick and slow movements.

Having fully described our invention, what we claim as new, and desire to secure by Letters Patent, is—

1. In a binocular microscope, the combination, with eye-lenses and large field-lenses, of two intermediate prisms, respectively located next to the eye-lenses and adapted to bring the two separate images nearer together, substantially as set forth.

2. The combination, with a plate-holder, a slide in which it is loosely fitted, and means for delicately adjusting the latter, of a frame which incloses the plate-holder and its slide, said frame being loosely fitted in a slide which moves in a line at right angles to the line of movement of the plate-holder slide, and being provided with means for delicate adjustment, said parts being thereby adapted to permit the plate-holder to be quickly or slowly adjusted in lines at right angles to one another, substantially as set forth.

3. In a binocular microscope, the combination, with eye-lenses and field-lenses, of two prisms located between said eye-lenses and field-lenses and adapted to bring the two separate images nearer together, substantially as set forth.

In testimony that we claim the foregoing—
I, EUSEBIUS J. MOLERA, do hereunto set my hand this 16th day of January, A. D. 1880.
   EUSEBIUS J. MOLERA.

Witnesses:
 THOMAS D. GRAHAM,
 GEO. J. SPECHT.

And I, JOHN C. CEBRIAN, do hereunto set my hand this 15th day of December, 1879.
   JOHN C. CEBRIAN.

Witnesses:
 T. B. HALL,
 A. W. BRIGHT.